No. 763,807. PATENTED JUNE 28, 1904.
G. L. STUEBNER.
FLEXIBLE WHEEL BASE CAR.
APPLICATION FILED DEC. 11, 1903.
NO MODEL. 2 SHEETS—SHEET 1.
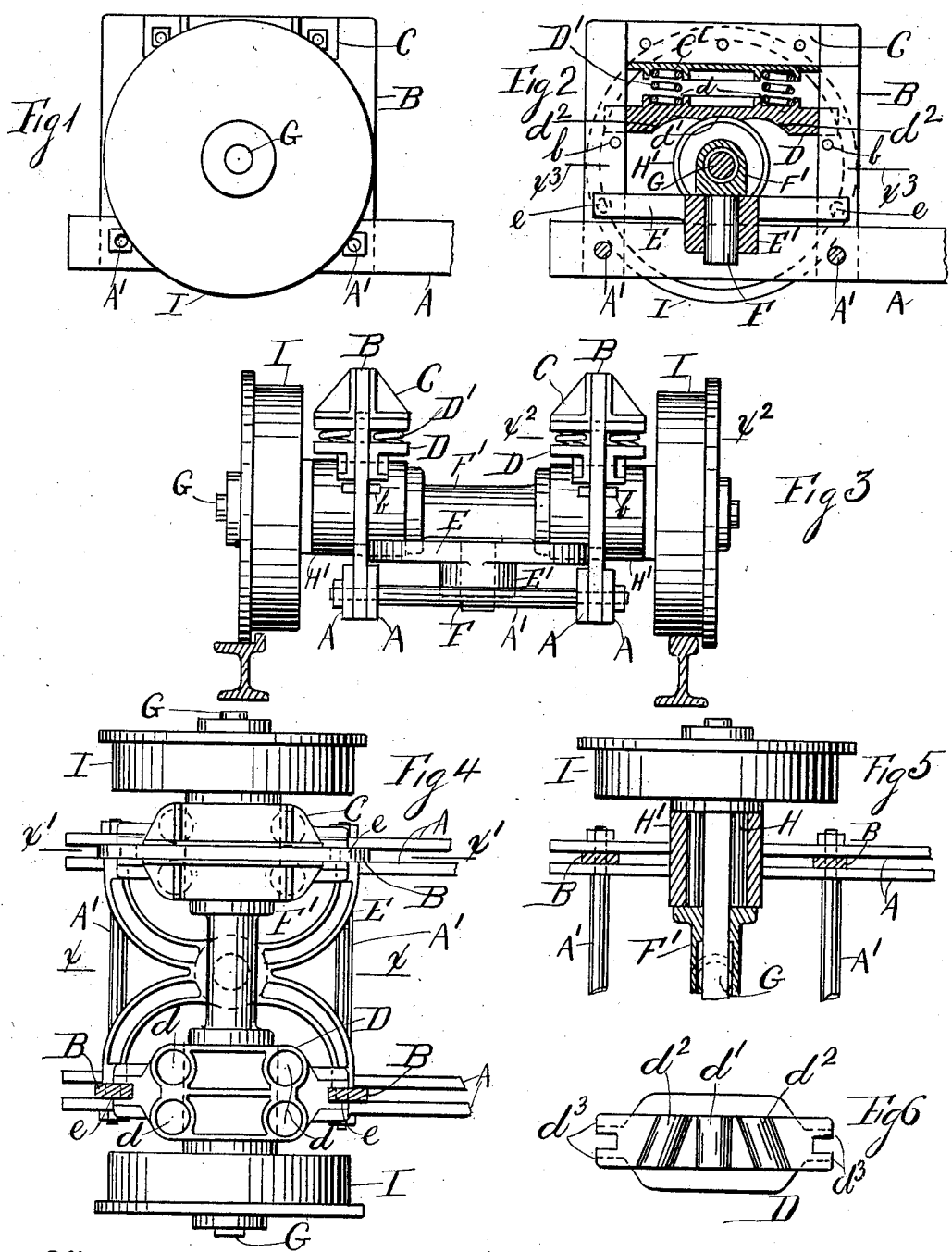
Witnesses
J. H. Carl.
G. A. Manwaring.
Inventor
Gustavus L. Stuebner
By his Attorney
A. A. de Bonneville

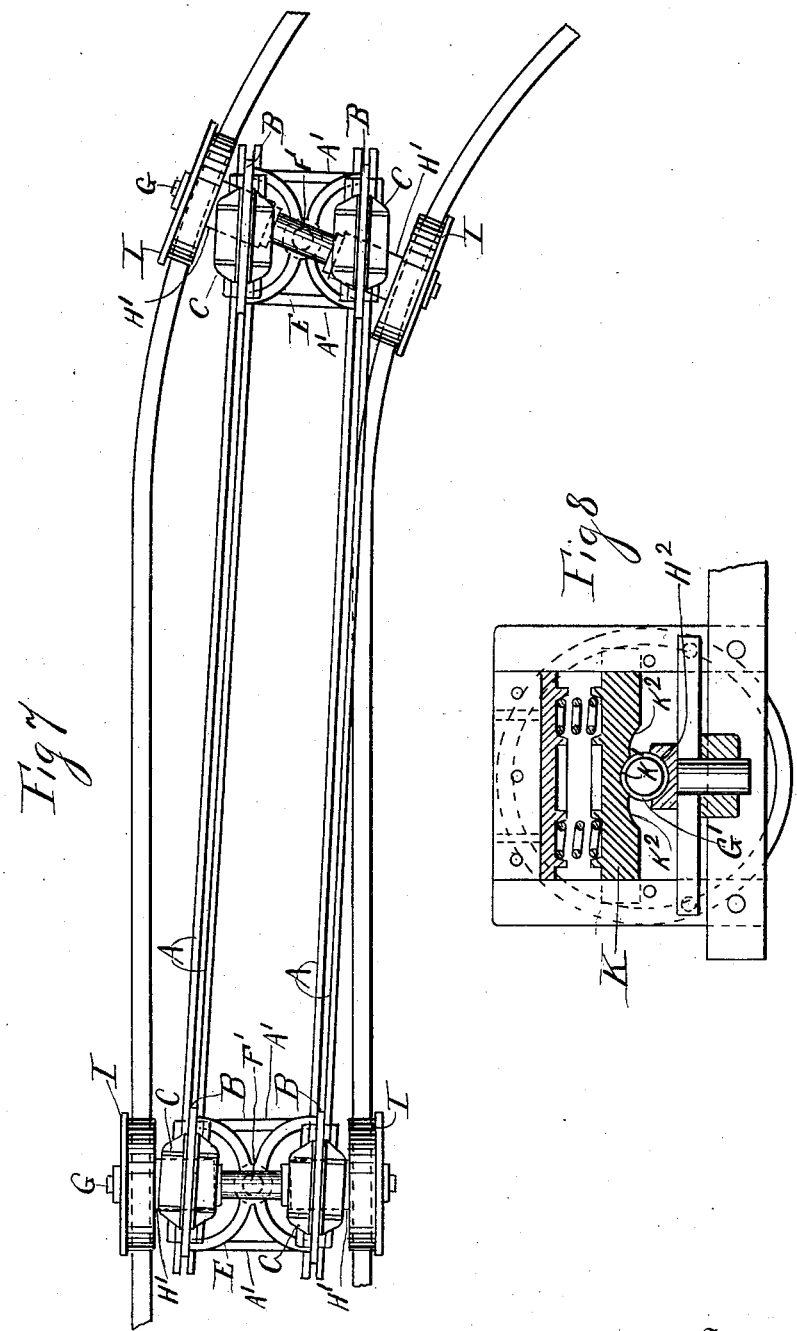

No. 763,807.

Patented June 28, 1904.

UNITED STATES PATENT OFFICE.

GUSTAVUS L. STUEBNER, OF FLUSHING, NEW YORK.

FLEXIBLE-WHEEL-BASE CAR.

SPECIFICATION forming part of Letters Patent No. 763,807, dated June 28, 1904.

Application filed December 11, 1903. Serial No. 184,808. (No model.)

*To all whom it may concern:*

Be it known that I, GUSTAVUS L. STUEBNER, a citizen of the United States, and a resident of Flushing, in the county of Queens and State of New York, have invented certain new and useful Improvements in Flexible-Wheel-Base Cars, of which the following is a specification.

This invention relates to means for vehicles, cars, trucks, and the like by virtue of which they can easily run on straight or curved paths. Its object is the production of a flexible wheel-base which can be used with wheels either running on their treads or flanges.

Referring to the drawings, Figure 1 is an elevation of one side of a truck with the invention. Fig. 2 shows sections of Fig. 4 on the lines $x\ x$ and $x'\ x'$. Fig. 3 represents an end view of Fig. 1 with one wheel bearing on its tread and the other on its flange. Fig. 4 shows a plan view of Fig. 3 and a partial section thereof as on the line $x^2\ x^2$. Fig. 5 is a partial section of Fig. 2 on the line $x^3\ x^3$. Fig. 6 represents a bottom plan view of a journal-box. Fig. 7 shows a plan view, on a reduced scale, of a car with the invention. Fig. 8 is a section similar to Fig. 2 modified.

The organization of the invention comprises a journal-box for a vehicle and the like in which an axle or shaft can easily adjust itself to various angular positions. This end is accomplished by providing the ends of the axles of the vehicles with sleeves that can turn around said axles when the latter are swinging around the king-bolts of the vehicles. Generally roller-bearings are inclosed around the axles by the said sleeves, and also the sleeves may be dispensed with, the journal-boxes in all cases being formed to allow for various angular positions of the axles.

In the drawings there is shown a truck or vehicle with side sills A, supported from truck-frames B, which latter are carried by the brackets C. A journal-box D carries springs D' in pockets $d$, formed in the upper face thereof, the said springs supporting the brackets C in the pockets C'. The journal-box D has generally formed on its lower face three curved cavities or bearings $d'$ and $d^2$, the said bearings being suitably concaved for the axles, or sleeves concentric with, encircling, or surrounding them, although one long bearing might be used with means to hold the axles in different angular positions therein. Lugs $d^3$ extend from the ends of the journal-box D, and pins $b$ project from the frames B, by means of which the journal-box is maintained in proper position and prevented from tipping.

Each pair of truck-frames B have interposed between them separators E, from which latter project pins $e$, that fit in holes in the said frames B. A bearing E' is formed in each separator for supporting a king-bolt F, which latter extends from a central bearing F' of the axle or shaft G, carrying the wheels I. The side sills A are held together by means of the bolts A'.

In the preferred form of the invention (shown in Figs. 1 to 7) the axle of the vehicle is supported on roller-bearings H, carried in the sleeve or casing H', which latter bears against the central bearing $d'$ of the journal-box D when the vehicle is on a straight pair of tracks, and when the vehicle is propelled over a curved pair of tracks the sleeve H' will turn about the axle H and roll in position in a pair of the angular bearings $d^2$. When the vehicle is again run over a straight pair of tracks, the sleeves, with the axle, will roll from the bearings $d^2$ to the central bearings $d'$, when the axle will assume a position at right angles to the longitudinal axis of the vehicle.

In Fig. 8 the roller-bearings H are dispensed with and a sleeve $H^2$ fits around the axle G' and rolls from bearings $K^2$ to K'.

Having described my invention, I claim—

1. The combination of an axle; a sleeve concentric with and encircling the said axle; a journal-box for the said sleeve with the said axle, arranged to allow the sleeve to roll and carry the axle to different positions.

2. In a vehicle the combination of an axle, a journal-box for said axle, a bearing in said box for the normal position of the axle to carry the vehicle on straight tracks and other bearings in said journal-box angular to the first bearing.

3. In a vehicle the combination of an axle, a sleeve around the axle, a journal-box, a bearing in said box for the sleeve when the axle is at right angles to the longitudinal axis of the vehicle, and other bearings in the box for the sleeve, the latter bearings making angles with the first bearing.

4. In a vehicle the combination of an axle, sleeves encircling and concentric with the ends of the axle, a central bearing for the axle, a king-bolt extending from said central bearing, a support for the king-bolt secured to the vehicle, a journal-box, the sleeves of the axle bearing in said box, bearings in said box for different positions of the axle.

5. In a vehicle the combination of an axle, a journal-box for said axle, a bearing in said box at right angles to the longitudinal axis of the vehicle, and other bearings angular to the first bearing, a sleeve around the axle, and rollers between the sleeve and axle.

6. In a vehicle the combination of an axle, rollers supporting the axle, a casing inclosing the rollers about the axle, a central bearing for the axle, a king-bolt extending from the said central bearing, a support for the king-bolt secured to the vehicle, a journal-box for the vehicle, bearings in the journal-box at right angles to the longitudinal axis of the vehicle, and other bearings in the journal-box making angles with the first bearing.

7. In a vehicle the combination of truck-frames, side sills supported from said frames, brackets secured to the frames, a journal-box adjustably held in each truck-frame, pins extending from the said frames adjacent to the journal-box, bearings making angles with each other in the journal-box, springs bearing between the brackets and journal-boxes, a spreader between the truck-frames, a central bearing supported on the spreader, tie-bolts clamping the side sills together, an axle passing through the central bearing, sleeves around the ends of the axle and bearing up against the journal-box.

8. In a vehicle the combination of an axle; a sleeve around and concentric with the axle; a bearing for the said sleeve to maintain the axle in its primary position, at right angles to the longitudinal axis of the vehicle; and other bearings for the sleeve, to allow the axle to make angles with its said primary position.

9. In a vehicle the combination of an axle, a sleeve around and concentric with the axle, a concaved bearing for the sleeve, for the primary position of the axle at right angles to the longitudinal axis of the vehicle and to maintain the vehicle in a straight path, a concaved bearing for the said sleeve and its axle to maintain the vehicle in a curved path, and means to allow the sleeve to roll with its axle from one bearing to the other, when the vehicle is running in a curved path.

Signed in the borough of Queens, in the county of Queens and State of New York, this 11th day of November, A. D. 1903.

GUSTAVUS L. STUEBNER.

Witnesses:
H. MATHISON,
CHAS. BRESLOFF.